United States Patent [19]
Hermes

[11] 3,770,528
[45] Nov. 6, 1973

[54] METHOD FOR THE SURFACE TREATMENT OF POLYIMIDE MATERIALS

[75] Inventor: Julius Hermes, Martinsville, Va.

[73] Assignee: Martin Processing Company, Incorporated, Martinsville, Va.

[22] Filed: Sept. 29, 1971

[21] Appl. No.: 184,801

[52] U.S. Cl. .................................. 156/2, 117/47 A
[51] Int. Cl. ............................................ B44d 1/092
[58] Field of Search ....................... 156/2; 252/79.4, 252/79.5; 134/42; 117/118, 47 A

[56] References Cited
UNITED STATES PATENTS

| | | | |
|---|---|---|---|
| 3,361,589 | 1/1968 | Lindsey | 117/118 |
| 3,551,204 | 12/1970 | Bolger et al. | 134/42 |
| 3,556,882 | 1/1971 | Fishman et al. | 156/2 |

*Primary Examiner*—Jacob H. Steinberg
*Attorney*—Richard K. Stevens et al.

[57] ABSTRACT

Polyimide materials are treated in such fashion as to impart to the treated surface thereof good bondability toward other materials, such as thin films of copper foil, to provide composite laminated articles useful in the industrial arts such as for printed circuitry and the like. The treatment consists essentially in subjecting the surface of the polyimide material to a solution, preferably anhydrous, of an alkali metal hydroxide in a high boiling glycol or glycol ether such as ethylene glycol, propylene glycol, dipropylene glycol, diethylene glycol, tetraethylene glycol, and the mono-ethers and di-ethers of such glycols.

7 Claims, 1 Drawing Figure

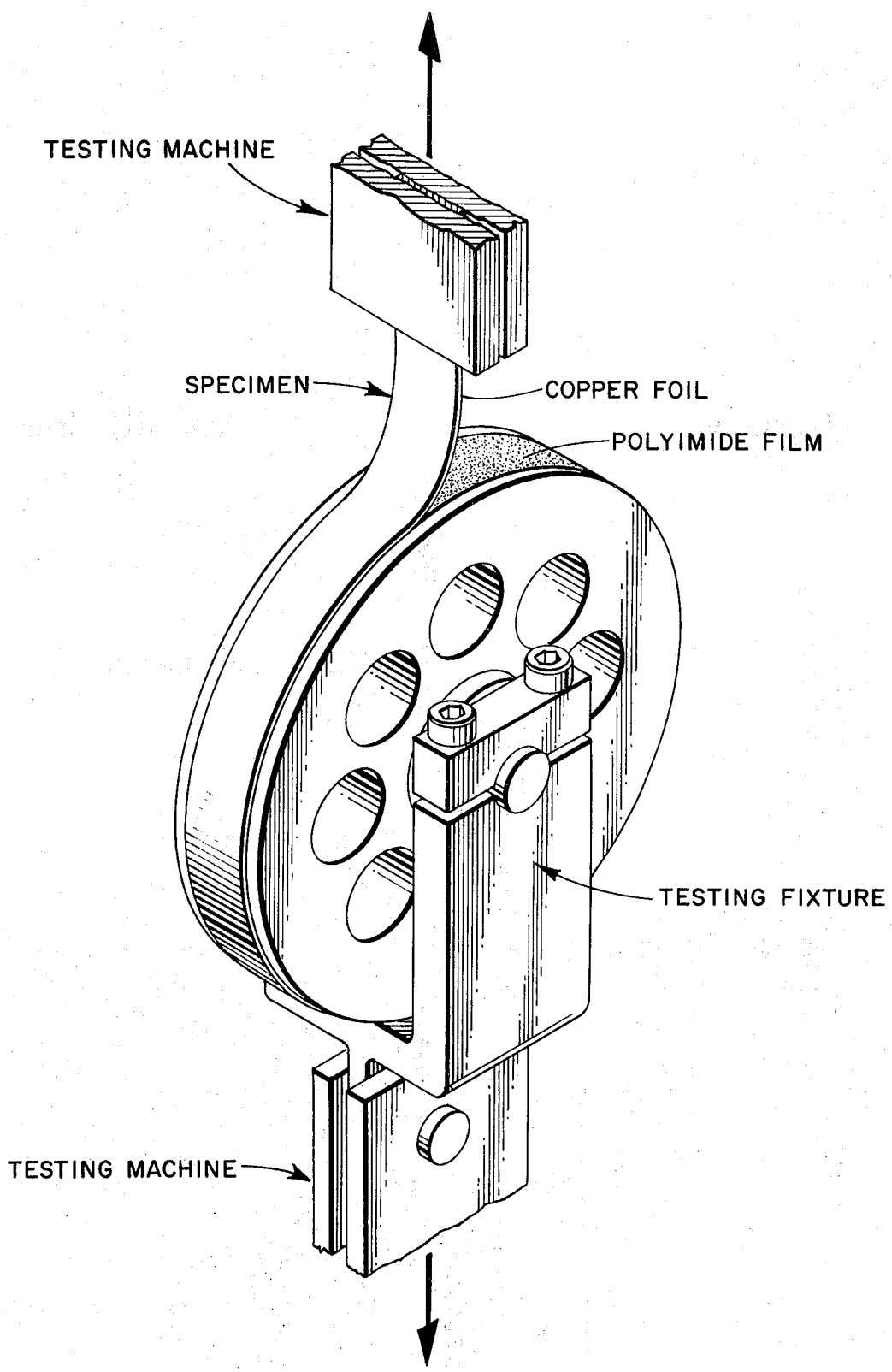

METHOD FOR THE SURFACE TREATMENT OF POLYIMIDE MATERIALS

The present invention relates to a method for chemically treating polyimide materials in such fashion as to alter the surface characteristics, and particularly with a view to rendering the polyimide materials greatly improved with respect to their ability to laminate with other materials to provide composite laminated materials useful in the industrial arts.

It has for some time been an important desideratum to provide a polyimide material having surface characteristics such that it can be laminated with e.g., thin copper foil in such fashion that a very strong bond will be created between the laminated layers. Thus, a thin film of polyimide strongly bonded to a thin film of copper foil results in a composite laminated article highly useful in certain technical arts such as printed circuitry and the like.

Previous attempts have been made to treat the surface of polyimide materials in such fashion as to alter the polyimide materials in the direction of imparting good bondability toward films of other materials, and these methods vary from delustering procedures to a very light etching so that the surface of the polyimide material presents under the microscope the appearance of gentle hills and valleys.

Efforts made previously to achieve this result include, for example, those indicated in duPont U.S. Pat. No. 3,361,589 to Lindsey, where it was suggested to treat the surface of polyimide materials with a basic compound such as sodium hydroxide or potassium hydroxide in an aqueous solution which may also include a lower alcohol such as methanol or ethanol.

I have now discovered that, surprisingly, greatly improved results are obtained by treating the surface of a polyimide material with a treating solution of sodium hydroxide or potassium hydroxide in a high boiling glycol or glycol ether such as ethylene glycol, propylene glycol, dipropylene glycol, diethylen glycol, tetraethylene glycol, or the mono-ethers or the di-ethers of these glycols such as the mono-ethyl ether or the dimethyl ether of any of the foregoing glycols.

Preferably, these glycol and glycol ether solutions of sodium hydroxide or potassium hydroxide are employed in substantially anhydrous form.

I have further discovered that by employing the treating solutions of the kind just mentioned under the conditions to be mentioned hereinafter, as distinguished from the treating solutions and conditions of the prior art, I can readily obtain polyimide articles having surfaces that are evenly etched, free of blotches, and of a bond-strength in the resulting laminating products that is greatly improved both as regards uniformity and in absolute value.

The glycol or glycol ether solutions of potassium hydroxide or sodium hydroxide may be employed over a rather wide range of conditions such as temperature, time of treatment, and concentration.

For example, temperatures as low as 25° C have been employed as well as temperatures at or near the boiling point of the respective treating solutions.

Times of treatment may be varied from as low as 5 seconds to as high as 60 seconds.

Generally speaking, for a given concentration of caustic alkali it is preferable to maintain a substantially inverse ratio between the temperature and the time of treatment; i.e., desirable results can be obtained with shorter times of treatment the higher the temperature, and this is one of the especially desirable features of this invention from the point of view of commerical feasibility.

The third factor mentioned above, namely, concentration, is also an important consideration because for a given temperature of treatment, the time of treatment will be lesser at a higher concentration of caustic alkali. For example, I have successfully employed glycol or glycol ether solutions or dispersions of sodium hydroxide or potassium hydroxide in which the caustic alkali content varied from 5 to 50 percent by weight, at temperatures varying from 50° C to about the glass transition temperature (Tg) [ ← Tg.] of the polyimide material and at times varying from 2 seconds to 60 seconds or more, respectively.

While those skilled in the art will appreciate that rather wide variations in the treating conditions whose limits have been mentioned above are permissible, at the same time for any given polyimide starting material some slight latitude must be accorded the skilled worker in selecting the optimum conditions within those broad limits that will give him satisfactory bonding characteristics with respect to the particular material, such as copper foil or the like, to be eventually bonded to the treated polyimide substrate.

The treatment of the polyimide material is preferably carried out under substantially atmospheric pressure.

The treatment may be conducted batch-wise or in a continuous manner.

After the treatment with the glycol or glycol ether solution of caustic alkali, the treated polyimide material is preferably subjected to a washing operation to remove excess treating agent. A suitable washing liquid for this purpose is water, and if desired, the wash liquid containing the excess treating solution may be subjected to conventional steps for the recovery of the glycol or glycol ether as well as the caustic alkali.

I do not wish to be limited to the treatment of any particular kind of polyimide material, especially since polyimide materials are old and well known and per se form no part of the present invention. Consequently, I deem it sufficient for disclosure purposes to refer broadly to the following source materials for further information on these per se old materials: the Lindsey patent cited above, and the following duPont brochures on Kapton polyimide films: F-1B, H-1B, H-2, H-4, H-12, H-77, H-97 and H-110C.

Suffice it to say that I understand Kapton polyimide film, in at least one commercially available form, to have the following polymeric unit structure:

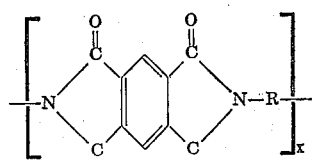

For further information on polyimides, see Kirk-Othmer's Encyclopedia of Polymer Technology, Vol. 7, 1967, pages 478 – 506, and especially pages 488 –

9, and Vol. 11, 1969, pages 247 – 272 and especially pages 267 – 8.

In order still further to illustrate the invention, the following more detailed description is given without limitation on the invention.

A comparison was made between the NaOH concentration and the treating time of the procedure according to the present invention and certain examples cited in the dePont U.S. Pat. No. 3,361,589 covering the treatment of Kapton film with alkaline aqueous solutions to improve the wettability and adherability properties. As shown by the data (For completeness, the methods by which the data were obtained are described and illustrated in considerable detail hereinafter.) in Table I below, the process of the present invention was as effective as the best treating condition cited in the duPont patent while requiring only a few seconds time compared to 5 – 10 minutes for the more effective Examples 1 and 3 of the patent. The process of the present invention is therefore eminently suitable for continuous operation and thus for commerical application.

The process of the present invention was compared with Examples 1, 3, 4, 5 of the duPont patent. In Examples 1 and 3, a commerical adhesive PI-1,200 (polyimide resin, duPont) was used as the adhesive since it falls in the category of a "polyimide acid made from an anhydride and diamine."

In Examples 4 and 5, a commerical product Epi-Rez 5155, an epoxy novolak having the same reactivity and equivalent weight of DEN438, was used as the adhesive. In addition to the adhesives cited in the duPont patent, commerical adhesives E-469 (a phenolic-butyral resin), E-1701 (a modified epoxy resin) and C-1730 (an acrylic epoxy resin) were evaluated with each of the treatments. The differences in the effectiveness of the treatments were most pronounced when using E-469 as the adhesive.

BRIEF DESCRIPTION OF THE DRAWING

The FIGURE in the drawing represents a view of a testing machine for bonding ability.

In order to test the results of the process of the present invention, the following two quality-control test methods were used. One of these was No. 1022 for testing the adherability of Kapton, and the other was No. 1000 for determining the laminate bond strength. Both tests make use of a testing fixture, including a so-called German wheel as shown in the accompanying drawing, as per the IPC (Institute of Printed Circuits) proposed specification No. 1PC-FC-250, June 1971. This fixture provides for reproducible peel angles for the separating films undergoding test.

The details of the test methods are as follows:

QUALITY CONTROL TEST METHOD -- TEST NO. 1022

PURPOSE:
The purpose of this test is to determine the bonding ability of Kapton/E-469 adhesive covercoat.
APPARATUS:
1. Platen Press
2. Instron
3. 1 inch Precision sample cutter
MATERIALS:
1. Kapton/E-469 covercoat to be tested.
2. 1 oz. ED treated copper.
3. Paper: 60 white woven 13 inches × 18 inches or equivalent.
PROCEDURE:
1. Cut equal sizes (6 inches × 8 inches) of covercoat material and copper.
2. Peel away the release sheet from the E-469 adhesive.
3. Place the treated side of the copper against the E-469 side of the covercoat material.
4. Put this sample between 8 sheets of paper, 4 over and 4 under.
5. This "sandwich" is put into the preheated platen press. Conditions: 325° to 350° F for 30 minutes at 20 tons of pressure.
6. After 30 minutes, cool the press while maintaining pressure.
7. Remove the sample and cut 1 inch specimens MD & TD for Instron testing.
8. Use the German Wheel (shown in the accompanying drawing) on the Instron (2 inches/minute crosshead speed). The Kapton should be affixed to the German wheel with the copper in the Instron jaw.
RESULTS:
A 3 lbs./inch minimum bond strength is required when 5 "low side" readings are average for a 2 inches length of sample.

QUALITY CONTROL TEST METHOD -- TEST NO. 1000

BOND STRENGTH:
The purpose of this test is to determine the amount of effort required to delaminate two films.
APPARATUS:
1. Thwing-Albert JDC precision 1 inch sample cutter.
2. Scott X-5 single strand tester with 3 inch × 1 inch jaws.
3. Table model Instron with accessories.
SPECIMENS:
Samples should be cut 1 inch wide using the 1 inch precision sample cutter. Length of the samples should be approximately 8 inches to 10 inches. Note (When bond strength is likely to exceed the limits of the Scott tester (6 lbs.), cut a ⅛ inch specimen using the Thwing-Albert ⅛ inch precision sample cutter. Use the same procedure, but multiply the results by 8 in order to obtain a lbs./in. result.)
PROCEDURE:
1. The sample should be delaminated approximately 1-½ inches to 2 inches by hand or with solvent when necessary.
2. When using the Scott tester, the separation rate will be 12 inches/minute. Put the heavier film in the top jaw, one film in the bottom jaw. Set the pointer at zero, and start the bottom jaw downward.
3. The Scott tester readings are taken at 90° and 180°.
   a. 90° -Hold sample tail parallel to the floor.
   b. 180° -Mold sample tail pointed to the floor.
4. When using the Instron, make sure that the scale is calibrated. The proper crosshead speed is selected and the proper load cell and scale are chosen. Put the heavier film in the top jaw, one film on the German wheel. Activate the cross-head drive and the chart drive. Five "low side" readings are averaged for a 2 inches length of sample.

RESULTS:

Results are to be expressed and recorded in pounds per inch of width.

The invention may be further illustrated by the following examples which are not intended to be limiting as to the scope or spirit of the invention.

EXAMPLE I

Treatment of polyimide film with a solution of sodium hydroxide in ethylene glycol.

Samples of film (2 mils in thickness) were treated with a 10 percent solution of sodium hydroxide in ethylene glycol at a temperature of 77° C. The films were treated under various conditions of time, after which the film samples were washed in clear water, dried and then were laminated with copper foil (2.8 mils) using a phenolic-butyral resin (E-469). The laminates were cured at a temperature of 160° C for 30 minutes, after which the laminate samples were subjected to laminate bond strength measurements.

The results obtained from this experiment were compared with the results obtained with laminates containing polyimide films treated according to Examples 1, 3, 4, 5 of the duPont U.S. Pat. No. 3,361,589 to Lindsey. The results obtained are shown in Table I.

TABLE I

| Sample | | Time sec. | Laminate Bond Strength pounds per inch |
|---|---|---|---|
| A. Present Invention | 1 | 15 | 6.8 |
| | 2 | 30 | 6.3 |
| | 3 | 45 | 6.3 |
| | 4 | 60 | 6.2 |
| B. duPont patent Example | 1 | 600 | 1.02 |
| | 3 | 600 | 1.25 |
| | 4 | 600 | 0.33 |
| | 5 | 600 | 0.75 |
| C. Untreated film | | | 1.00 |

The test methods by which the above results were obtained are described in detail above.

The improvement in bond strength in the resulting laminates containing polyimide films treated according to the present invention are just indicated will be apparent from the above results.

EXAMPLE II

Treatment of polyimide film with a solution of potassium hydroxide in ethylene glycol.

Samples of film (2 mils) were treated with a 10 percent solution of potassium hydroxide in ethylene glycol at a temperature of 77° C. Film-copper laminates were then prepared and tested for bond strength as described in Example I. The results obtained are shown in Table II.

TABLE II

| Sample No. | Time sec. | Laminate Bond Strength pounds per inch |
|---|---|---|
| 1 | 15 | 7.4 |
| 2 | 30 | 8.1 |
| 3 | 45 | 7.7 |
| 4 | 60 | 7.9 |

The improvement in laminate bond strength resulting from the treatment of polyimide films with a potassium hydroxide solution in ethylene glycol will be apparent from the above results.

Example III

Treatment of polyimide film with a solution of both sodium hydroxide and potassium hydroxide in ethylene glycol.

Samples of film (3 mils) were treated with a solution of both sodium hydroxide and potassium hydroxide in ethylene glycol. The films were treated under various conditions of time and temperature as shown in Table III.

TABLE III

| Sample No. | Temp. °C. | Time sec. | Sodium hydroxide concentration percent | Potassium hydroxide concentration percent |
|---|---|---|---|---|
| 1 | 120 | 30 | 4.0 | 4.0 |
| 2 | 135 | 20 | 4.0 | 4.0 |
| 3 | 150 | 10 | 4.0 | 4.0 |

All of the above film samples were adjudged to be very uniformly etched and well adapted for laminating.

Example IV

Treatment of polyimide film with a solution of potassium hydroxide in ethylene glycol under various conditions of time, temperature and concentration.

Samples of films were treated with a solution of potassium hydroxide in ethylene glycol under various conditions of time, temperature and concentration as shown in Table IV.

TABLE IV

| Sample No. | Temp. °C. | Time sec. | Caustic alkali concentration, percent | Film thickness mils |
|---|---|---|---|---|
| 1 | 170 | 10 | 25.0 | 2.0 |
| 2 | 152 | 15 | 25.0 | 2.0 |
| 3 | 144 | 20 | 25.0 | 2.0 |
| 4 | 130 | 25 | 25.0 | 2.0 |
| 5 | 160 | 10 | 15.0 | 5.0 |
| 6 | 153 | 15 | 15.0 | 5.0 |
| 7 | 145 | 20 | 15.0 | 5.0 |
| 8 | 135 | 30 | 15.0 | 5.0 |
| 9 | 130 | 35 | 15.0 | 5.0 |
| 10 | 120 | 40 | 15.0 | 5.0 |

For a given caustic alkali concentration of the treatment solution, the substantially inverse ratio between the temperature and the time of treatment will be apparent from the above results. All films were well etched and well adapted for laminating.

Example V

Treatment of polyimide film with a solution of potassium hydroxide in ethylene glycol under various conditions of caustic alkali content of the treatment solution.

Samples of film were treated with a solution of potassium hydroxide in ethylene glycol. The films were treated under various conditions of time and caustic content as shown in Table V.

TABLE V

| Sample No. | Temp. °C. | Time sec. | Caustic alkali concentration percent | Film thickness mils |
|---|---|---|---|---|
| 1 | 130 | 30 | 10 | 5 |
| 2 | 130 | 20 | 15 | 5 |
| 3 | 130 | 15 | 20 | 5 |

| | | | | |
|---|---|---|---|---|
| 4 | 130 | 10 | 30 | 5 |
| 5 | 130 | 25 | 25 | 2 |
| 6 | 130 | 20 | 30 | 2 |
| 7 | 130 | 15 | 40 | 2 |

It will be apparent from the above results that for a given temperature of treatment, the time of treatment will be lesser at a higher concentration of caustic alkali. All the film samples showed very good etching, well adapted for laminating.

Example VI

Treatment of polyimide film with a solution of sodium hydroxide in di-ethylene glycol.

Samples of film (2 mils) were treated with a 15 percent solution of sodium hydroxide in di-ethylene glycol at a temperature of 77°C. The films were treated under various conditions of time, washed in water and dried, after which film-copper laminates were prepared and tested for laminate bond strength as in Example 1.

The results obtained from this experiment are shown in Table VI.

TABLE VI

| Sample No. | Time, sec. | Laminate Bond Strength pounds per inch |
|---|---|---|
| 1 | 15 | 5.4 |
| 2 | 30 | 5.7 |
| 3 | 45 | 5.9 |
| 4 | 60 | 5.5 |

EXAMPLE VII

Treatment of polyimide film with a solution of potassium hydroxide in di-ethylene glycol.

Samples of film (2 mils) were treated with a 15 percent solution of potassium hydroxide in di-ethylene glycol at a temperature of 77° C. Film-copper laminates were then prepared and tested for bond strength as described in Example I. The results obtained are shown in Table VII.

TABLE VII

| Sample No. | Time sec. | Laminate Bond Strength pounds per inch |
|---|---|---|
| 1 | 15 | 5.9 |
| 2 | 30 | 6.0 |
| 3 | 45 | 6.0 |
| 4 | 60 | 6.2 |

Example VIII

Treatment of polyimide film with a solution of potassium hydroxide and benzyl alcohol in ethylene glycol.

Samples of film (2 mils) were treated with a 15 percent solution of potassium hydroxide and benzyl alcohol in ethylene glycol. The films were treated under various conditions of alcohol concentration as shown in Table VIII.

TABLE VIII

| Sample No. | Temp., °C. | Time sec. | Benzyl alcohol concentration percent |
|---|---|---|---|
| 1 | 150 | 25 | 2.0 |
| 2 | 150 | 25 | 4.0 |
| 3 | 150 | 25 | 6.0 |

Well etched films excellently adapted for laminating were obtained.

Example IX

Treatment of polyimide film with a solution of potassium hydroxide in tetra-ethylene glycol under various conditions of time and temperature of treatment.

Samples of film (5 mils) were treated with a 10 percent solution of potassium hydroxide in tetra-ethylene glycol under various conditions of time and temperature, after which film-copper laminates were prepared and tested for bond strength according to the procedure of Example I.

The results obtained from this experiment are shown in Table IX.

TABLE IX

| Sample No. | Temp. °C. | Time sec. | Caustic alkali concentration, percent | Laminate Bond strength pounds per inch |
|---|---|---|---|---|
| 1 | 165 | 10 | 30 | 9.7 |
| 2 | 155 | 15 | 30 | 9.5 |
| 3 | 145 | 20 | 30 | 9.8 |
| 4 | 135 | 30 | 30 | 9.2 |

Example X

Treatment of polyimide film with a solution of sodium hydroxide in tetra-ethylene glycol under various conditions of caustic concentration of the treatment solution.

Samples of film (1 mil) were treated with a solution of sodium hydroxide in tetra-ethylene glycol. The samples were treated under various conditions of time and caustic content of the treatment solution as shown in Table X. Film-copper laminates were then prepared and tested for laminate bond strength as in Example I.

TABLE X

| Sample No. | Temp. °C. | Time sec. | Caustic alkali concentration, percent | Laminate Bond strength pounds per inch |
|---|---|---|---|---|
| 1 | 200 | 30 | 15 | 5.1 |
| 2 | 200 | 20 | 25 | 5.3 |
| 3 | 200 | 10 | 30 | 5.5 |

I claim:
1. A method for surface-treating a polyimide material in order to improve the adherability thereof to other materials comprising subjecting said polyimide material to treatment with a solution of an alkali metal hydroxide in a relatively high boiling glycol or glycol ether, the caustic alkali content of the treating solution varying from about 5 percent up to about 50 percent depending upon the time and temperature of the treatment.

2. A method as defined in claim 1, wherein said alkali metal hydroxide is sodium hydroxide or potassium hydroxide.

3. A method as defined in claim 1, wherein the glycol or glycol ether solution is substantially anhydrous.

4. A method as defined in claim 1, wherein the glycol or glycol ether is selected from the class consisting of ethylene glycol, propylene glycol, diethylene glycol, dipropylene glycol, tetraethylene glycol, and mono-lower alkyl and di-lower alkyl ethers thereof.

5. A method as defined in claim 1, wherein the mono-lower alkyl and di-lower alkyl ethers are methyl ethers.

6. A method as defined in claim 1, wherein the treatment is carried out at temperatures ranging from about 50° C up to about the glass transition temperature (Tg.) of the polyimide material.

7. A method as defined in claim 1, wherein the treatment is carried out for a time ranging from about 2 seconds to 60 seconds or more.

* * * * *